Sept. 23, 1952     W. R. CUSTER     2,611,555
JET-PROPELLED AIRCRAFT WITH FUSELAGE LIFTING CHANNELS
Filed Jan. 31, 1950
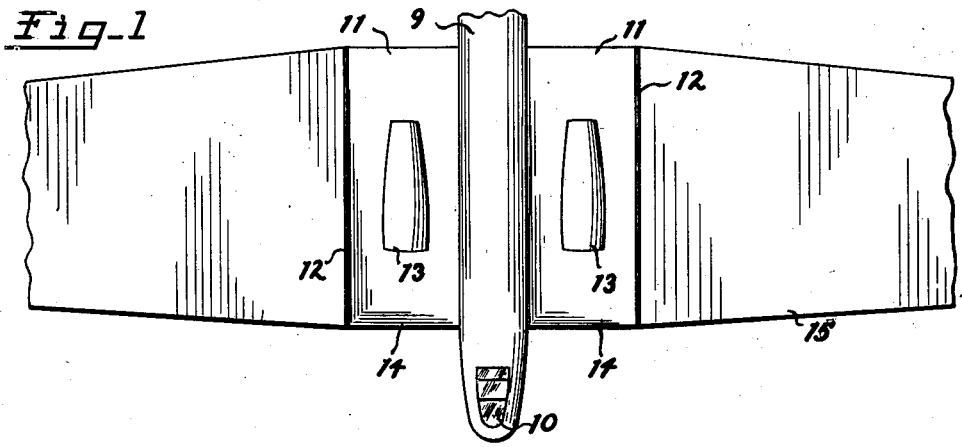
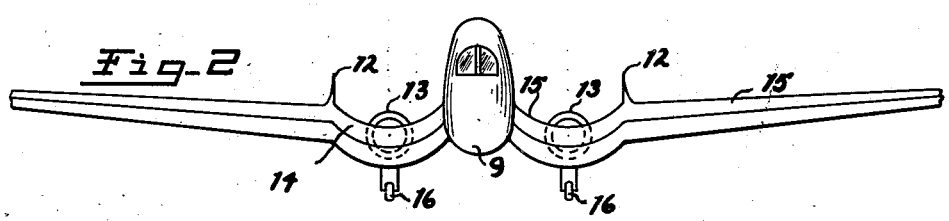
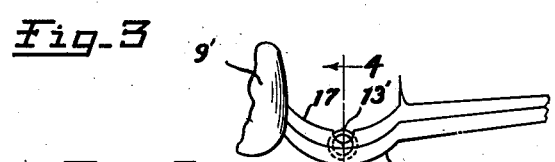
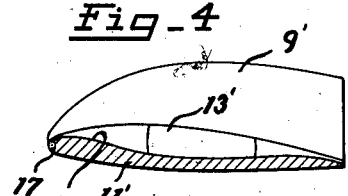
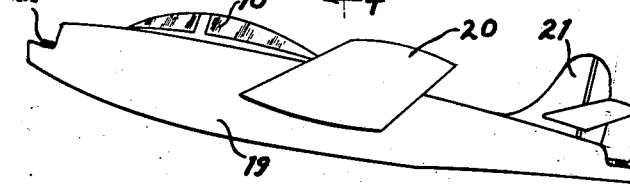
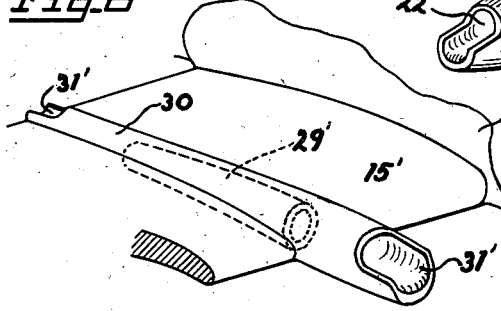
Inventor
WILLARD R. CUSTER
By Farmey † O'Connell
Attorney Patented Sept. 23, 1952

2,611,555

UNITED STATES PATENT OFFICE 2,611,555

JET-PROPELLED AIRCRAFT WITH FUSELAGE LIFTING CHANNELS

Willard R. Custer, Hagerstown, Md.

Application January 31, 1950, Serial No. 141,555

2 Claims. (Cl. 244—12)

This invention relates to jet propelled aircraft, and more particularly to such aircraft employing the Custer channel wing.

As is well known in the art, the jet propelled aircraft presently in use lack stability at the critical periods of take-off and landing. This is due to two factors. First, when the jet aircraft is nosed up into the air at take-off, it is not being pushed in a direction parallel to the ground and the jet engine cannot get sufficient air at critical positions, causing the aircraft to falter. This insufficiency of air is caused by the air skidding over the intake of the jet as it is mushing and not traveling directly opposite thrust. Secondly, the jet aircraft has no lift at the mouth of the engine, nor does it have the gyroscopic action of a propeller but is dependent upon the thrust of the motor for stability. As a result, it is very dangerous at take-off and landing speeds, and in case of emergency, such as overshooting the landing field, the aircraft cannot, at times, recover quickly enough to avert a crash. This is due to the smallness of the expulsion opening of the engine.

By using the Custer channel wing in conjunction with a jet engine, the air supply furnished the engine is adequate and the reaction of air, induced at high velocity, flowing over the fixed surface of the channel, front and rear, produces a lift not available in the conventional jet propelled aircraft; as a consequence, there is greater stability both in take-off and landing operations.

Other objects will be apparent from the following description taken with the accompanying drawings, wherein:

Figure 1 is a fragmentary top plan view of an airplane constructed according to the teaching of the invention, a jet motor being disposed in each channel and coaxial therewith;

Figure 2 is a front elevational view of the same;

Figure 3 is a front elevational view of a modified form of the invention showing a duct in the bottom of the airfoil channel in which the motor is mounted;

Figure 4 is a cross sectional view of the form of invention shown in Figure 3, taken longitudinally of the channel on the line 4—4 of Figure 3 looking in the direction of the arrows showing the motor in side elevation;

Figure 5 is a perspective view of another modified form of the invention embodying a tubular fuselage with jet motor, the fore and aft ends having their upper halves removed to provide upwardly opening channels;

Figure 6 is a detailed fragmentary perspective view of the modification shown in Figure 5;

Figure 7 is a top plan view of a further modification of the invention with jet tubes extending from the forward edges of the wings at the roots of the latter;

Figure 8 is a fragmentary perspective view of still a further modified form of the invention wherein a tube is mounted in each wing, the fore and aft parts of the tube having portions thereof cut away to form upwardly opening channels.

On each side of a fuselage 9, with cockpit 10, is a channel 11, semi-cylindrical in shape, opening upwardly and extending parallel to the fuselage. Each channel is elongated to provide lifting area at low speeds that can be relieved of drag for high speed jet planes. This is accomplished by control of the boundary layer due to the air induced and expelled by the motor gases. Upwardly extending baffles 12 issue from the outboard edges of channel 11 and serve to aerodynamically isolate the channels. The bottom of each channel is preferably airfoiled. A jet motor 13 is mounted in the bottom of each channel as shown in Figure 2. Wing portions 15 are disposed contiguously with and span-wise from channel 11. Landing gear, comprising wheels 15, 16, is mounted beneath the channels. In operation of the embodiment shown in Figures 1 and 2, the air passes over the airfoiled surfaces of the channel 11 and into the mouth of the jet engine 13.

The channel 11 extends fore and aft of the jet engine 13 and induces a lifting force which is greatest when the aircraft is not moving, or moving at a very low speed. This force is a function of the difference in speeds of the air and gases in the channel and the air beneath the channel. This lifting force lends greater stability to the aircraft in take-off and is even more beneficial in landing operations, since, in case of emergency it enables the plane to sustain itself until the conventional reaction to the thrust gives the aircraft more velocity. Experiments have shown that by directing air into the intake of the engine by means of a channel, more air will pass through the mouth of the engine. Also, the choking off effect caused by insufficient supply of air, prevalent with conventional types of jet planes, will be alleviated and the engine will have greater thrust and greater overall efficiency.

In the modification of the invention shown in Figures 3 and 4, the fuselage 9' is equipped with channel wings, the channels being indicated at 11'. The bottom of each channel is airfoiled, as indicated at 17, and provided with a duct 18 which extends from the fore to the aft edge of the channel as shown in Figure 4. A motor 13' is mounted in the duct approximately midway the ends of the latter. The forward end of the duct 18 provides a relatively narrow channel inlet for the duct 18 through which air passes into the mouth of the motor 13'.

In the form of invention shown in Figures 5 and 6 a combined jet tube and fuselage 19 is shown, the tube being provided with cockpit 10', conventional wings 20 and an empennage 21. The upper half of the fore and aft terminals of the tube 19 is removed to provide upwardly opening channels 22 which communicate with the fore and aft terminals of the motor indicated at 13, in the form of invention illustrated in Figures 1 and 2, mounted in the tube.

In the form of the invention illustrated in Figure 7, a fuselage 23 is shown, the fuselage being equipped with laterally extending conventional wings 24. The root of each wing is provided at its front edge with an upwardly opening channel 25. Each channel 25 communicates with a jet tube 26 which extends rearwardly into the fuselage 23, the tubes converging at the aft end of the fuselage. The upper half of each tube is removed to provide upwardly opening channels 27 disposed below and on opposite sides of a tail 28. Each of the tubes 26 has a jet motor 29 mounted therein.

In the form of invention illustrated in Figure 8, instead of employing channels, as shown at 11 in the form of invention illustrated in Figures 1 and 2, I use a jet tube 30, the forward end of which extends beyond the forward end of the wing 15' in which it is mounted, and in parallel relation to the fuselage 9². The rear end of the tube 30 terminates at the rear end of the wing 15'. The fore and aft ends of the tube 30 have their upper halves removed to provide upwardly opening channels 31'. A jet motor 29' is mounted in the tube 30.

The operation of the forms of invention illustrated in Figures 3 to 8 inclusive, is basically the same as the operation of the form of invention illustrated in Figures 1 and 2. Consequently, the mode of operation above set out for said form of invention and the advantages flowing therefrom, are here applicable.

It is to be understood that various changes may be made in the invention within the scope of the claims hereto appended.

What I claim is:

1. An aircraft comprising a fuselage equipped with wings, the opposite ends of the fuselage being semi-cylindrical and opening upwardly to provide fore and aft channels, and a jet motor mounted in the fuselage intermediate said channels and in communication with the latter.

2. An aircraft comprising a tubular fuselage equipped with wings, the opposite ends of the fuselage being open in the direction of flight, the terminals of said ends being semi-cylindrical and opening upwardly to provide fore and aft channels, and a jet motor mounted in the fuselage intermediate said channels and in communication with the spaces defined by the upwardly opening ends of the fuselage.

WILLARD R. CUSTER.

REFERENCES CITED

The following references are of record in the file of this patent:

UNITED STATES PATENTS

| Number | Name | Date |
|---|---|---|
| 1,353,955 | Hering | Sept. 28, 1920 |
| 2,004,256 | Trey | June 11, 1935 |